Jan. 28, 1964     W. W. McGAUGHY ETAL     3,119,797
PROCESS FOR REFINING POLYOLEFINS
Filed July 30, 1956
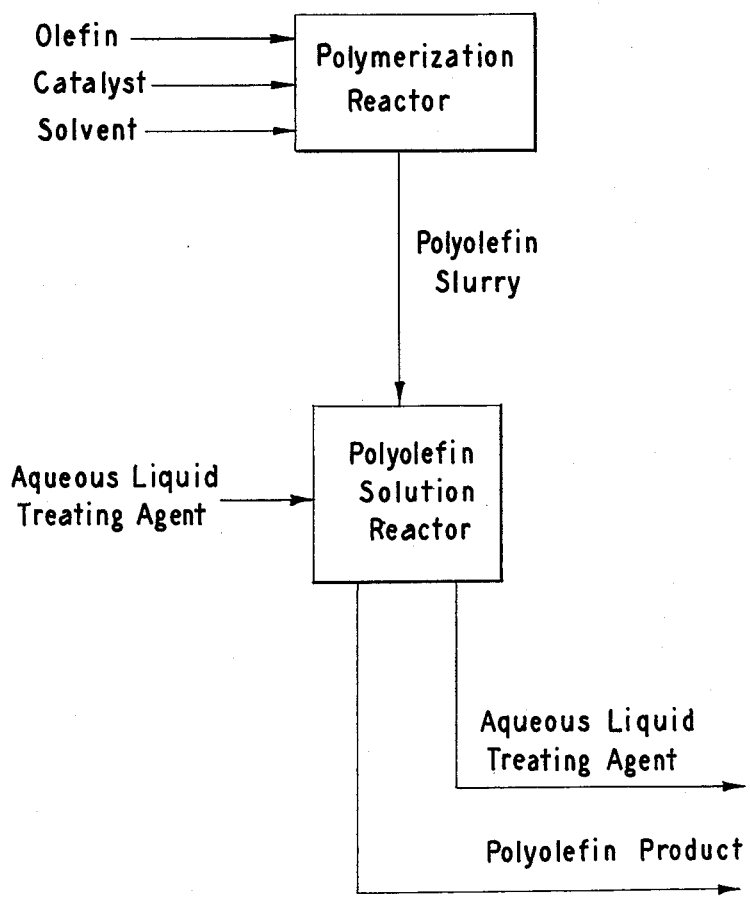
INVENTORS
WILLIAM W. McGAUGHY
HELMUT W. SCHULZ
BY Fransis M. Fazio
ATTORNEY United States Patent Office 3,119,797
Patented Jan. 28, 1964

3,119,797
PROCESS FOR REFINING POLYOLEFINS
William W. McGaughy, South Charleston, and Helmut W. Schulz, Charleston, W. Va., assignors to Union Carbide Corporation, a corporation of New York
Filed July 30, 1956, Ser. No. 600,713
22 Claims. (Cl. 260—93.7)

This invention relates to refining polyolefins prepared by polymerizing an olefin or mixture of olefins in the presence of metal compound catalyst compositions and particularly those comprising at least one organo-metallic compound. More particularly the present invention is concerned with a process for removing from polyolefins thus prepared substantially all the catalyst composition and catalyst residues or decomposition products.

It is known to polymerize olefins such as ethylene, propylene, the isomeric butylenes, pentenes and like, individually or in admixture to form respectively high molecular weight homopolymers and copolymers by contacting the olefin or mixture of olefins with catalyst compositions comprising organo-metallic compounds and compounds of transition elements selected from groups IVB, VB, and VIB of the periodic systems of elements.

Such catalyst compositions and particularly those comprising an alkyl aluminum as for example aluminum triisobutyl, or diisobutyl aluminum chloride as one component, and as the other component a halide of titanium or zirconium, for example titanium tetrachloride or zirconium tetrachloride are usually dispersed in an aliphatic or aromatic hydrocarbon liquid free from olefinic unsaturation as for example toluene or heptane. For convenience these hydrocarbon liquids are hereinafter sometimes referred to as diluents. The olefin or mixture of olefins is fed into such mixture of diluent and catalyst at normal or moderate pressures of several atmospheres and polymerization usually proceeds at ambient temperatures or if desired the reaction system can be maintained at elevated temperatures, for example 50–150° C.

The olefin polymer or copolymer formed in such catalyst-promoted reaction systems at reaction temperatures below about 90° C. is generally insoluble in the hydrocarbon liquid and thus is usually deposited or dispersed as a slurry of fine solid particles in the hydrocarbon liquid. On the other hand when the temperature of the reaction system is above the melting point of the polymer, the liquid polymer and the hydrocarbon liquid are generally miscible with each other. However cooling a miscible mixture of hydrocarbon liquid and polymer to below the melting point of the polymer causes precipitation of the polymer forming a slurry thereof in the hydrocarbon liquid. The precipitated polymer, however, in either instance, contains undesirable amounts of catalyst residues which if allowed to remain in the polymer tend to degrade the polymer as evidenced by discoloration particularly when heated as in a molding or extrusion operation and by poor dielectric properties.

It has been proposed to remove catalyst residues from slurries of olefin polymers of the kind under discussion by adding to such slurries an alcohol such as methanol, isopropanol, or butanol which are non-solvents for the polymer. The alcohol stops or quenches the polymerization reaction. The polymer is then filtered or otherwise mechanically separated from alcohol and hydrocarbon liquids and the filtered polymer is again washed with fresh alcohol. Since the catalyst or residue thereof retained by the polymer is a metal compound, or a mixture of such compounds, the amount retained by the polymer can be conveniently determined by burning the polymer in the presence of sulphuric acid to convert all the metals to their oxides and to oxidize all the organic material to carbon dioxide.

Generally alcohol washing can cause a significant reduction in ash content. For instance, a polyethylene resulting from the polymerization of ethylene in the presence of a catalyst composition comprising an alkyl aluminum and a titanium halide dispersed in a hydrocarbon liquid such as toluene will ordinarily have an ash content of between about 0.1 and 2.0 percent by weight. Quenching the reaction with an alcohol, however, followed by further washing of the precipitated polymer can reduce the ash content of the polyethylene to between about 0.2 and 0.04 percent.

A drawback is the cost of the alcohol and the cost of separating, recovering, and purifying the alcohol and diluent. As much as 25 to 30 pounds of alcohol may be required for each pound of purified resin.

If the hydrocarbon diluent is largely separated from the polymer before the alcohol washing step, to avoid mixing alcohol and diluent, the polymer tends to darken if in contact with air before the alcohol washing is completed. Moreover, not all the diluent can be readily separated from the polymer. The retained diluent is extracted by alcohol washing, and thus it in turn must be removed from the alcohol before the latter can be used again as a washing medium.

It has now been found that catalysts comprising metallic compound, or organo-metallic compounds, and residues thereof, can be removed more economically and more efficiently from polyolefins prepared in the presence of such catalysts and a hydrocarbon diluent by heating the polymer and diluent to form a homogeneous fluid mixture, the heating being preferably to at least the melting temperature of the polymer, vigorously agitating the fluid mixture with water which reacts with the catalyst composition or catalyst residues to form therewith among other possible reaction products water-insoluble products such as hydrated metallic oxides and hydroxides and water-soluble products such as hydrogen halides, the agitation of the fluid mixture, and the water being conducted under sufficient pressure to maintain the water in the liquid phase at the temperature of the hot fluid mixture of polymer and diluent and the agitation being continued until a substantial proportion of the catalyst composition and residues are removed from the polymer and the hydrocarbon diluent to the water phase, and then separating the water phase containing water-soluble and water-insoluble catalyst residues from the polymer and hydrocarbon diluent.

The water phase containing the catalyst residues can be removed as by decantation and replaced with fresh charges of water to extract more catalyst components while the system is maintained at a liquefying temperature for the polymer. The additional washing may be done by counter-current feeding of hot water or by continuous washing using a continuous liquid-liquid contactor such as a centrifugal contactor. The purified liquid mixture of polyolefin and hydrocarbon diluent can then be filtered if desired to remove any solid matter which may be present therein and the filtered solution then cooled to below the melting point of the polyolefin thereby causing precipitation of the polyolefin as a fine particle slurry in the hydrocarbon diluent. The slurry can be filtered or centrifuged to separate the diluent from the polyolefin. Remaining traces of diluent on the polyolefin particles can then be removed as by steam-distillation, followed by drying of the particles at moderate temperature to remove water.

The figure is a flow diagram of the claimed invention. As shown in the figure, olefin, catalyst and solvent are introduced into the polymerization reactor wherein a slurry of polyolefin in solvent is produced. This reactor is generally equipped with agitating and cooling means. The polyolefin slurry is then heated in the polyolefin solution reactor to produce a solution of the polymer in the solvent while it is in contact with an aqueous liquid treating agent as herein defined. Thereafter, the polyolefin is separated from the aqueous liquid treating agent and the polyolefin product recovered therefrom.

In a preferred embodiment of the invention the hot fluid mixture of polyolefin and diluent after being mixed with one or more charges of water and while still containing the last charge of water is permitted to cool without agitation to a temperature below the melting point of the polyolefin thereby forming a two-phase system comprising as a lower phase a water layer containing soluble and insoluble catalyst components and residues, and an upper phase being a mush-like slurry of diluent swollen polyolefin particles and diluent. Surprisingly, by removing the water phase and replacing it with fresh charges of water, vigorously agitating the system, a greater amount of catalyst matter is removed from the polyolefin than can be removed by extended washing with water of the hot liquid solution of polyolefin and diluent.

While not essential, it is usually desired to initially subject at ambient temperatures the slurry of catalyst-containing polymer and hydrocarbon diluent to one or more water washes before heating the slurry to form a solution of the polymer and the diluent and water-washing said solution. The water-wash at ambient temperatures or at elevated temperatures but below that producing a solution of the polymer in the hydrocarbon diluent removes a major part of the catalyst residues, thus decreasing the amount to be removed in the subsequent hot washing step with water.

Thus in the preferred embodiment for a batch-operation, polyethylene or other polyolefin, containing metal compound catalyst residues and in the form of a slurry of polyolefin particles in a hydrocarbon diluent liquid such as toluene, xylene, hexane, heptane, or kerosene is agitated at ambient or room temperatures with water and preferably water containing enough alkaline material such as potassium hydroxide to maintain the pH of the slurry in the range of 8 to 10. Typically, 0.25 percent to 1 percent potassium hydroxide in the water will suffice. The slurry may be added to the water, or the water to the slurry. The relative volumes of water and slurry are not critical, and successful use has been made of relative volumes varying from two to ten parts of slurry per one part of water. The slurries may contain from 1 percent to 50 percent by weight polyolefin particles, the remainder being essentially the diluent containing catalyst residues either dispersed therein as visible size particles or in a colloidal state, the catalyst residues constituting ordinarily from about 0.1 percent to 2 percent by weight of the polyolefin crude. The water may be at ambient temperatures or warmed to, say 30° C. to 60° C. After agitation has been terminated, most of the catalyst residues collect as soluble compounds in the water layer and as insoluble compounds deposited in the water layer. The water layer and deposited solids are removed, as for example by decantation.

The polymer-diluent slurry left after the water is decanted as just described is mixed with more alkaline water. Usually, 0.25 percent to 1 percent potassium hydroxide or equivalent in the water will be satisfactory, and the volume of water may be, conveniently, one quarter to one half the volume of the slurry, although somewhat less or considerably more may be used. The polymer-diluent-alkaline water mixture is then agitated and heated to a sufficiently high temperature to melt and dissolve the polyolefin in the diluent. That temperature will, of course, depend on the particular polyolefin and diluent. About 130° C. to 150° C. is usually suitable for polyethylene prepared in the presence of toluene or heptane as diluent. The mixture is then cooled without agitation forming a soft mush-like slurry in which the polyolefin particles are swollen and distended by absorbed diluent. The cooled water layer is decanted, carrying away additional ash. The polymer-diluent slurry is then washed, preferably two or three times, with water which removes traces of alkali and more ash. The diluent is removed from the polymer by filtration or distillation, and the recovered polymer is dried, for instance by air or vacuum drying at 60° C. The polymer so purified has a very low ash content, usually 0.005 percent to 0.05 percent, excellent color stability and lack of odor.

The contacting of the polymer-diluent solution with water under pressure may be carried out either batch-wise, as described above, or by feeding simultaneously the polymer-diluent mixture and the wash water to a centrifugal pump and thence to a tank for separation of the water layer. The process can be carried out continuously in counter-current flow through a suitable contacting device. In another embodiment of the continuous counter-current contacting of the polyolefin solution in hydrocarbon with water under pressure, the polymer-hydrocarbon diluent slurry from a continuously-operated polymerization autoclave is pumped continuously to the base of a high-pressure tower which may be filled with inert packing or fitted with perforated horizontal plates through which the fluids are forced in counter-current flow by appropriate pulsing of the feed streams. An alkaline water solution is introduced to the column approximately midway between the top and bottom heads, while demineralized water or steam condensate is introduced near the top of the column. The temperature of the fluids in the column is maintained sufficiently high (preferably above the melting point of the polymer), to insure homogeneous solution of the polymer in the diluent. The column is operated under autogenous pressure as determined by the vapor pressure of the water and diluent employed. In operation the polymer solution flows upwardly through the column in counter-current contact with the water which partially reacts with and insolubilizes catalyst components and residues and causes the unsolubilized catalyst particles to pass into the downward flowing water phase to be removed with the water from the base of the column. The upward flowing polymer-diluent solution is progressively freed from dissolved and suspended catalyst components and residues and leaves the top of the column as an essentially ash-free solution. If desired, the polymer-diluent solution may then be filtered as described in Example 5 to insure the removal of any solid particles that may have been physically entrained by the hydrocarbon phase.

The purification process of this invention as applied to typical polyolefin crudes will be described in the subsequent examples.

A typical crude polyethylene product was prepared by bubbling ethylene gas at a rate of 85 pounds per hour into 200 gallons of toluene containing 1.18 pounds of diisobutyl aluminum chloride and 0.63 pound of titanium tetrachloride. Continuous agitation was used to maintain a uniform dispersion of the catalyst composition in the toluene. Temperature of the reaction mixture was maintained between 50° C. and 60° C. until 180 pounds of crude polyethylene (of a melt index between 2 and 3.5) had formed as a slurry of fine solid particles in the toluene diluent. The previously known method for separating such crude polyethylene from the diluent and for removing catalyst residues required several washings with a total of about 29 pounds isopropanol per pound of polyethylene to yield a purified polyethylene having an ash content of 0.11 percent and an original color index of 56.7 and a color index after heating of 50.4.

*Example 1*

In accordance with the preferred practice of this invention, a portion of the crude mixture of polyethylene prepared as described immediately above was washed once at a temperature of about 60° C. with 0.5 volume of water which contained enough potassium hydroxide to maintain the water layer at a pH of 10 during the washing. The wash water was decanted, and 0.25 volume of fresh wash water containing potassium hydroxide was added. The mixture was then heated under a pressure maintaining the water in the liquid phase to 140° C. and with agitation thereby forming a solution of the polyethylene in the toluene which was further vigorously agitated in the presence of the alkaline water for about 30 minutes. The mixture was then cooled without agitation until the polyethylene precipitated out of solution in the toluene diluent in the form of small flocculent particles. The water layer was drained off, and the polyethylene-diluent mixture washed three times with equal volumes of alkali-free fresh water at ambient temperatures. The diluent and part of the water were then distilled off, the polyethylene filtered from the remaining water and dried at 60° C. The resulting purified polyethylene had an ash content of 0.010 percent, an original color index of 95, and a color index after heating of 80.

*Example 2*

A portion of the same crude polymer-diluent slurry as that used in Example 1 was treated as in Example 1 except that the crude slurry was not washed with water before heating of the slurry to 140° C. The resultant purified dried polyethylene had an ash content of 0.017 percent.

*Example 3*

A crude polypropylene was prepared by bubbling propylene gas at an average rate of 44 pounds per hour into 411 gallons of heptane containing 6.56 pounds of an organo-metallic catalyst comprising an alkyl aluminum and a titanium halide.

About 415 pounds of the above prepared crude polypropylene solution containing 25 pounds of polymer was diluted with 1400 pounds of heptane. About 100 gallons of water were added and while being vigorously mixed, the polypropylene solution and water mixture was held at 130° C. at which temperature the polymer was completely dissolved in the heptane and at a gauge pressure of about 70 p.s.i. for one hour. The mixture was cooled to 50° C. to precipitate the polypropylene as a soft mush-like slurry in the diluent and the water layer drained. The polypropylene resin-heptane slurry was washed two times at an ambient temperature of 20–25° C. with 200 gallons of demineralized water each time, and the water layers drained. The slurry was centrifuged to separate the resin from the diluent, and the resin dried. A sample of the dry resin had an ash content of 0.07 percent.

*Example 4*

Ethylene gas at a rate of 100 pounds per hour, toluene at 500 pounds per hour, and a catalyst composition consisting of 0.17 pound of triisobutyl aluminum and 0.28 pound of titanium tetrachloride per hour were fed together and mixed in an autoclave at a reaction temperature of 50° C. and at a gauge pressure of 10 pounds per square inch. Continuous withdrawal was made of the reaction mixture at a rate maintaining a substantially constant 250 gallon reactant mixture in the autoclave. The average production rate of polyethylene formed was 25 pounds per hour; the average polymer solids in the diluent being 5 percent by weight. One hundred pounds of this slurry was charged to another autoclave containing six gallons of demineralized water. The contents of the autoclave were then heated to a temperature of 122° C.; forming a solution of the resin in the toluene, which was agitated vigorously for 20 minutes to completely contact the water and the solution. The mixture was then cooled without agitation until the resin precipitated out of solution in the form of small flocculent particles. The water was drained leaving trapped in the slurry perhaps one percent water which was distilled off. The polymer had an ash content of 0.04 percent by weight, based upon analysis of a dried sample.

*Example 5*

A plate and frame filter press having a filtering area of 1.7 square feet was dressed with cotton filter cloth and pre-coated using 35 pounds of Johns-Manville Hyflo Super-Cel filter aid. The pre-coat was equal to 13 pounds per 100 square feet of filter area. Three hundred and forty grams of the same type filler aid was added to the 5 percent solids polyethylene slurry resulting from the catalyst removal treatment described in Example 4. The slurry was pumped through a heat exchanger to solubilize the resin in the toluene at a temperature of 150° C.–160° C. and the resulting hot solution forced through the plate and frame filter. The test was made at 150° C. with a 10-to-45 pound pressure drop across the filter. The test required 15 minutes at rates of 135 pounds of solution per square foot per hour and 2.35 pounds of resin per square foot per hour. The ash content of the recovered product was 0.02 percent and the resin had an initial color index of 66.4 and a heated color index of 58.

*Example 6*

Ethylene gas at a rate of 80 pounds per hour, heptane at 750 pounds per hour, and a catalyst composition consisting of 0.47 pound of a 50 percent by weight mixture of triisobutyl aluminum and diisobutyl aluminum chloride and 0.83 pound of titanium tetrachloride per hour were fed together and mixed in an autoclave at a reaction temperature between 50 and 60° C. and at a gauge pressure of 25 pounds per square inch. Continuous withdrawal was made of the reaction mixture at a rate maintaining a substantially constant 300 gallon reactant mixture in the autoclave. The average production rate of polyethylene formed was 45 pounds per hour; the average polymer solids in the diluent slurry being 6 percent by weight. The unpurified resin contained 0.71 percent ash by weight. Seventy pounds of this slurry was diluted to 3 percent solids with 70 pounds of heptane and heated in an agitated vessel to 130° C. to form a solution of the polyethylene in the heptane. The hot solution was passed countercurrently to demineralized water through a Podbielniak centrifugal liquid-liquid contactor. The water was heated to 124° C. to 130° C. under pressure and fed at a rate of 125 cubic centimeters per minute. The solution was fed at a rate of 125 cubic centimeters per minute. After 30 minutes operation, a sample of the product was taken and allowed to cool, precipitating the resin. The resin was filtered off and dried in a circulating air oven at 60° C. to 65° C. for 24 hours. The purified polyethylene product contained 0.07 percent ash by weight.

The processes herein described may be adapted to either batchwise or continuous operations. For example, in continuous operation the resin-diluent mixture can be removed continuously from the polymerization autoclave and the aqueous alkali such as potassium hydroxide introduced as a side stream. Mixing of the resin-diluent-aqueous potassium hydroxide mixture can take place in a centrifugal pump or in a column or tank, from which the water layer is continuously drained from the column or tank. The resin-diluent mixture may be heated in a jacketed pipe or other type of heat exchanger to swell, melt, and dissolve the resin, and may be cooled to re-form a slurry in a similar or other piece of equipment or by other methods. The resin-diluent solution may be washed with water continuously in a column under pressure, or by simultaneously feeding the resin-diluent mixture and the wash water to a centrifugal pump, thence to a column or tank for separation of the water layer.

The diluent may be evaporated from the resin in a dryer at temperatures sufficiently low to avoid agglomeration of the resin particles or may be filtered from the resin and the remaining traces evaporated in a vacuum oven or a circulating air or nitrogen oven.

The neutralization may be carried out at ambient temperature or any other convenient temperature. Other water-soluble alkaline materials may be used as a substitute for a potassium hydroxide as for example sodium hydroxide, sodium carbonate, ammonium hydroxide, ethylenediamine, and similar water-soluble amines.

The necessary temperature to form a hot solution of polymer and diluent will vary with the particular olefin polymer and with the diluent, but any temperature sufficient to make a solution of the polymer that can be agitated and intimately mixed with the water layer can be used.

The solids content of the slurry that can be processed by this technique can vary from 1 to 50 percent but for practical reasons the preferred range is from 3 to 15 percent solids.

As used herein, "melt index" refers to the melt index determined by the method specified in ASTM D–1238–52T and is expressed as the flow of resin in grams per ten minutes under the conditions of the specified method. "Color index" refers to the number obtained by measuring (using a General Electric Spectrophotometer or a resin plaque 35 mils thick) the reflectance at 430 and 670 millimicrons, multiplying the former by two and subtracting the latter, i.e., color index=$(R_{430} \times 2) - R_{670}$. Color index after heating is determined in the same manner after heating the plaque between two glass plates for 45 minutes at 177° C. Reflectance is referred to MgO as 100 percent.

The demineralized wash water used in the several examples contained from 0.5 to 2.0 parts per million of salt calculated as sodium chloride. A low mineral content in the wash water is desirable so as not to introduce ash-forming impurities with the wash water.

What is claimed is:

1. A method for removing hydrocarbon insoluble metal catalyst residues from a solid polyolefin obtained by polymerizing an alpha olefin in the presence of a liquid hydrocarbon free from olefinic unsaturation and a dispersed polymerization catalyst consisting of a mixture of a lower-alkyl aluminum compound and a halide of the transition metals, selected from the group consisting of the metals of groups IVB, VB, and VIB of the periodic system of the elements, which comprises heating the mixture of polyolefin, liquid hydrocarbon, and dispersed polymerization catalyst to form a liquid solution of polyolefin in the liquid hydrocarbon, introducing water to the heated liquid solution to transfer the catalyst and catalyst residues to the water phase while the liquid solution is maintained at its solution temperature, and then separating the water from the polyolefin solution.

2. Process according to claim 1 wherein water containing a water-soluble alkali is mixed with the solution of polyolefin and liquid hydrocarbon.

3. Process according to claim 1 wherein prior to the step of forming a liquid solution of the polyolefin and the liquid hydrocarbon a slurry of solid polyolefin particles in the hydrocarbon liquid is washed with water to remove at least part of the catalyst and catalyst residues, the water then separated therefrom, the washed slurry being then heated to form a solution of the polyolefin in the hydrocarbon liquid, and the solution then washed with water.

4. Process according to claim 1 wherein after the mixture of water and liquid solution of polyolefin and liquid hydrocarbon has been formed, the mixture is cooled without agitation until solid polyolefin particles are precipitated from the hydrocarbon liquid and then separating the water from the polyolefin and the hydrocarbon liquid.

5. Process according to claim 1 wherein after the water has been separated from the hot solution of polyolefin, the hot solution is filtered.

6. Process according to claim 1 wherein the polyolefin is polyethylene.

7. Process according to claim 1 wherein the polyolefin is polypropylene.

8. A method for removing hydrocarbon insoluble metal catalyst residues from a solid polyolefin prepared by polymerizing an alpha olefin in the presence of a liquid hydrocarbon free from olefinic unsaturation and a dispersed polymerization catalyst consisting of a mixture of a lower-alkyl aluminum compound and a halide of the transition metals, selected from the group consisting of the metals of groups IVB, VB, and VIB of the periodic system of the elements, which comprises heating the mixture of polyolefin, liquid hydrocarbon, and dispersed polymerization catalyst to form a liquid solution of polyolefin in the liquid hydrocarbon, feeding said liquid solution upwardly through the base of a wash column in a counter-current contact with downwardly flowing water maintained at a temperature above that at which the polymer precipitates out from solution in the hot liquid hydrocarbon, and removing polymer solution substantially freed of catalyst residues from the top of the wash column.

9. Process according to claim 8 wherein an aqueous alkaline solution is introduced in the mid-portion of the column.

10. The method of removing impurities from a polymer prepared by catalytic polymerization in the presence of a catalyst having at least two essential components, one of said components being a metal compound selected from the group consisting of group IV, group V and group VI metal compounds, and another of said components being an organo-metal compound selected from the group consisting of an alkyl aluminum compound, which comprises contacting a solution of said polymer in a relatively inert, non-deleterious solvent, liquid under the conditions of the process containing said impurities and a liquid treating agent immiscible with said solution selected from the group consisting of water and aqueous alkaline solutions at a temperature of at least about 122° C. at which the polymer is in solution in said inert, non-deleterious solvent, forming two separate phases from the contacted materials, namely, a solvent phase containing said polymer and a liquid treating agent phase, said treating agent selectively extracting impurities from the solvent phase, and recovering polymer from said solvent phase.

11. The method of treating a polymer prepared by catalytic polymerization in the presence of a catalyst having at least two essential components, one of said components being a metal compound selected from the group consisting of group IV, group V and group VI metal compounds, and another of said components being an organometal compound selected from the group consisting of an alkyl aluminum compound, which comprises contacting a solution of said polymer in a relatively inert, non-deleterious solvent, liquid under the conditions of the process containing said catalyst as an impurity and an aqueous liquid treating agent immiscible with said solution selected from the group consisting of water and aqueous alkaline solutions at a temperature of at least about 122° C. at which the polymer is in solution in said inert, non-deleterious solvent, forming two separate phases from the contacted materials, namely, a solvent phase containing said polymer and an aqueous liquid treating agent phase, said treating agent selectively extracting impurities from the solvent phase, and recovering polymer from said solvent phase.

12. The method of treating a polymer prepared by catalytic polymerization in the presence of a catalyst having at least two essential components, one of said components being a metal compound selected from the group consisting of group IV, group V and group VI metal compounds, and another of said components being an organometal compound selected from the group consisting of an alkyl aluminum compound, which comprises contacting a solution of said polymer in a relatively inert, non-deleterious solvent, liquid under the conditions of the process containing said catalyst as an impurity and water at a temperature of at least about 122° C. at which the polymer is in solution in said inert, non-deleterious solvent, forming a water phase and a solvent phase containing said polymer, separating the phases, and recovering polymer from said solvent phase.

13. The method of treating a straight chain monoolefin polymer wherein the monoolefin has from 2 to 5 carbon atoms, said polymer being prepared by catalytic polymerization in the presence of a catalyst having at least two essential components, one of said components being a metal compound selected from the group consisting of group IV, group V and group VI metal compounds, and another of said components being an organometal compound selected from the group consisting of an alkyl aluminum compound, which comprises contacting a solution of said polymer in a relatively inert, non-deleterious solvent, liquid under the conditions of the process containing said catalyst as an impurity and an aqueous liquid treating agent immiscible with said solution selected from the group consisting of water and aqueous alkaline solutions at a temperature of at least about 122° C. at which the polymer is in solution in said inert, non-deleterious solvent, forming two separate phases from the contacted materials, namely, a solvent phase containing said polymer and an aqueous liquid treating agent phase, said treating agent selectively extracting impurities from said solvent phase, and recovering polymer from said solvent phase.

14. The method of treating a polyethylene polymer prepared by catalytic polymerization in the presence of a catalyst having at least two essential components, one of said components being a metal compound selected from the group consisting of group IV, group V and group VI metal compounds, and another of said components being an organometal compound selected from the group consisting of an alkyl aluminum compound, which comprises contacting a solution of said polymer in a relatively inert, non-deleterious solvent, liquid under the conditions of the process containing said catalyst as an impurity and water at a temperature of at least about 122° C. at which the polymer is in solution in said inert, non-deleterious solvent, forming two separate phases from the contacted materials, namely, a solvent phase containing said polymer and a water phase, said water selectively extracting impurities from said solvent phase, and recovering polymer from said solvent phase.

15. The method of treating a polyethylene polymer prepared by catalytic polymerization in the presence of a catalyst having at least two essential components, one of said components being a metal compound selected from the group consisting of group IV, group V and group VI metal compounds, and another of said components being an organometal compound selected from the group consisting of an alkyl aluminum compound, which comprises contacting a solution of polyethylene in a solvent selected from the group consisting of liquid hydrocarbons, and 0.1 to 0.5 volume of water per volume of polymer solution while maintaining a temperature of at least about 122° C. at which the polymer is in solution in said inert, non-deleterious solvent, forming a water phase and a solvent phase containing said polymer, separating said phases, and recovering polyethylene polymer from the solvent phase.

16. A method of making an olefin polymer wherein the olefin is a member of the ethylene series having 2 to 5 carbon atoms having a low ash content which comprises contacting a solution of said olefin polymer in a relatively inert, non-deleterious solvent, liquid under the conditions of the process prepared by catalytic polymerization in the presence of a catalyst having at least two essential components with water at a temperature of at least about 122° C. at which the polymer is in solution in said inert, non-deleterious solvent, one of said components being a group IV to group VI metal compound and another of said components being an organometal compound selected from the group consisting of an alkyl aluminum compound, forming a water phase and a solvent phase containing said polymer, and recovering polymer from the solvent phase.

17. A method of making polyethylene having a low ash content which comprises contacting a solution of polyethylene in a solvent selected from the group consisting of liquid hydrocarbons prepared by catalytic polymerization in the presence of a catalyst having at least two essential components with water at a temperature of at least about 122° C. at which the polymer is in solution in said solvent, one of said components being a group IV to group VI metal compound and another of said components being selected from the group consisting of an organometal compound selected from the group consisting of an alkyl aluminum compound, forming a water phase and a solvent phase containing said polymer, and recovering polymer from the solvent phase.

18. The method of treating a polymer prepared by catalytic polymerization in the presence of a catalyst having at least two essential components, one of said components being a metal compound selected from the group consisting of group IV, group V and group VI metal compounds, and another of said components being an organometal compound selected from the group consisting of an alkyl aluminum compound, which comprises contacting a solution of said polymer in a relatively inert, non-deleterious solvent, liquid under the conditions of the process containing said catalyst as an impurity and a liquid treating agent immiscible with said solution selected from the group consisting of water and aqueous alkaline solutions at a temperature of at least about 122° C. at which the polymer is in solution in said inert, non-deleterious solvent, forming two separate phases from the contacted materials, namely a solvent phase containing said polymer and a liquid treating agent phase, said treating agent selectively extracting impurities from the solvent phase, recovering solid polymer from the solvent phase and washing the solid polymer.

19. A method of making an olefin polymer having a low ash content wherein the olefin is a member of the ethylene series having 2 to 5 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least about 122° C. at which the polymer is in solution in said inert, non-deleterious solvent, one of said components being selected from the group consisting of group IV metal halides, group V metal halides, group VI metal halides, another of said components being an organometal compound selected from the group consisting of an alkyl aluminum compound, forming a water phase and a solvent phase containing said polymer, and recovering polymer from the solvent phase.

20. A method of making an olefin polymer having a low ash content wherein the olefin is a member of the ethylene series having 2 to 5 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least about 122° C. at which the polymer is in solution in said inert, non-deleterious solvent, one of said components being triisobutyl-aluminum and another of said components being titanium tetrachloride, forming a water phase and a solvent phase containing said polymer, and recovering polymer from the solvent phase.

21. A method of making an olefin polymer having a low ash content wherein the olefin is a member of the ethylene series having 2 to 5 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least about 122° C., one of said components being triisobutyl-aluminum and another of said components being titanium tetrachloride, forming a water phase and a solvent phase containing said polymer, and recovering polymer from the solvent phase.

22. A method of making an olefin polymer having a low ash content wherein the olefin is a member of the ethylene series having 2 to 5 carbon atoms which comprises contacting a solution of said olefin polymer in a relatively inert, non-deleterious solvent, liquid under conditions of the process, prepared by catalytic polymerization in the presence of a catalyst having at least two essential components, with water at a temperature of at least 251.6° F., one of said components being triisobutyl-aluminum and another of said components being titanium tetrachloride, forming a water phase and a solvent phase containing said polymer, and recovering polymer from the solvent phase.

References Cited in the file of this patent

UNITED STATES PATENTS

| | | |
|---|---|---|
| 2,451,047 | Skooglund et al. | Oct. 12, 1948 |
| 2,482,056 | Elwell et al. | Sept. 13, 1949 |
| 2,507,100 | Garber et al. | May 9, 1950 |
| 2,537,130 | Green | Jan. 9, 1951 |
| 2,606,179 | Boyd | Aug. 5, 1952 |
| 2,699,457 | Ziegler | Jan. 11, 1955 |
| 2,838,477 | Roelen et al. | June 10, 1958 |
| 2,843,577 | Friedlander et al. | July 5, 1958 |
| 2,886,561 | Reynolds et al. | May 12, 1959 |